United States Patent [19]

Meier

[11] Patent Number: 5,482,360
[45] Date of Patent: Jan. 9, 1996

[54] ANTI-LOCK BRAKE CONTROL SYSTEM

[75] Inventor: Thomas Meier, Le Vaudové, France

[73] Assignee: Robert Bosch GmbH, Stuttgart, Germany

[21] Appl. No.: 322,605

[22] Filed: Oct. 13, 1994

[30] Foreign Application Priority Data

Oct. 22, 1993 [DE] Germany ............. 43 36 080.7

[51] Int. Cl.⁶ ..................................... B60T 8/32
[52] U.S. Cl. ........................................ 303/182; 303/183
[58] Field of Search ................. 303/93–95, 97, 303/100, 102, 103, 105, 107, 108; 364/426.02

[56] References Cited

U.S. PATENT DOCUMENTS

| 4,702,337 | 10/1987 | Burckhardt et al. | 180/197 |
| 4,729,608 | 3/1988 | Fennel et al. | 303/106 |
| 4,763,263 | 8/1988 | Leiber | 364/426 |
| 4,841,446 | 6/1989 | Leiber et al. | 303/97 X |
| 5,117,933 | 6/1992 | Sigl et al. | 180/197 |
| 5,141,294 | 8/1992 | van Zanter et al. | 303/100 X |
| 5,210,690 | 5/1993 | Kageyama et al. | 303/95 X |

FOREIGN PATENT DOCUMENTS

| 3707235 | 9/1988 | Germany . |
| 2176557 | 12/1986 | United Kingdom . |
| 8807456 | 10/1988 | WIPO . |
| 9114604 | 10/1991 | WIPO . |

*Primary Examiner*—Josie Ballato
*Attorney, Agent, or Firm*—Felfe & Lynch

[57] ABSTRACT

An ABS for an all-wheel-drive vehicle in which the wheel slip is included in the instability criterion. The gradient of the reference speed required for determining the wheel slip is limited, when the vehicle is accelerating, to the measured acceleration of the vehicle if the acceleration of the wheels is greater than the acceleration of the vehicle.

6 Claims, 1 Drawing Sheet

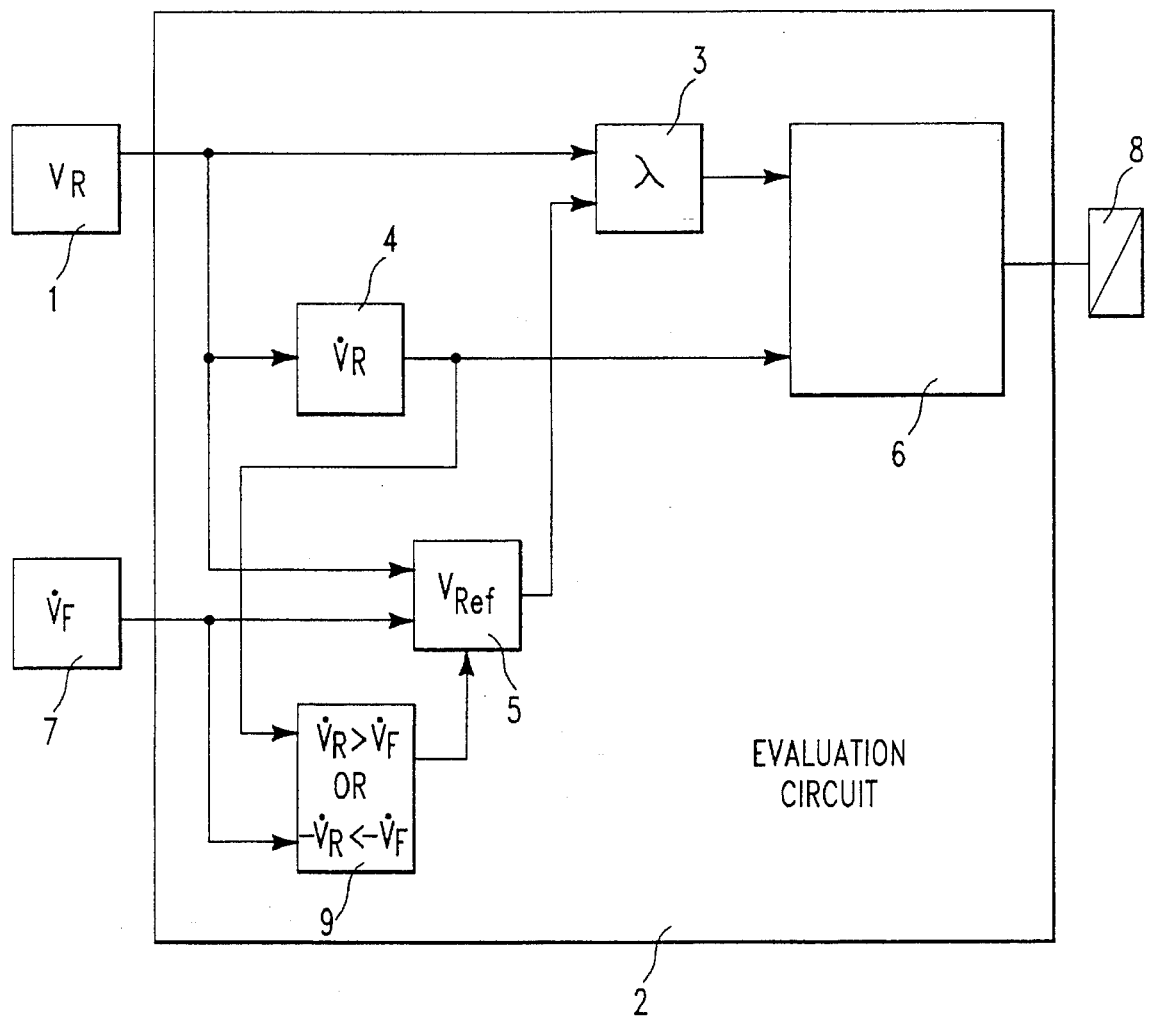

ANTI-LOCK BRAKE CONTROL SYSTEM

BACKGROUND OF THE INVENTION

The invention relates to an ABS wherein the vehicle reference speed is determined using the signal of a vehicle acceleration sensor when an instability occurs.

Such an anti-lock brake control system is known from DE 37 07 235.6. In this publication, the deceleration of the vehicle determined with the acceleration sensor determines the decrease in the reference speed in the case of instability of the wheels (e.g. wheel slip).

SUMMARY OF THE INVENTION

The invention uses the vehicle acceleration sensor (possibly additionally) to limit the rise in the reference speed in phases of acceleration of the vehicle in order to avoid a false reference speed due to slight slipping of the wheels. An excessively high reference speed can lead to under braking of the vehicle during a subsequent anti-lock control. In the case of slight drifting in a bend, when the invention is used the reference speed lies on the safe side.

BRIEF DESCRIPTION OF THE DRAWING

The sole FIGURE is a schematic of the ABS according to the invention.

DETAILED DESCRIPTION OF THE PREFERRED EMBODIMENT

A wheel speed sensor 1 is assigned to each of the driven wheels. The wheel speed sensor supplies its wheel speed signal $V_R$ to an evaluation circuit 2 which itself contains a slip former 3, a differentiator 4, a reference former 5 and a block 6 for forming the instability criterion. In order to form the slip, the reference speed $V_{Ref}$ is fed to the slip former 3. The slip value λ and the deceleration $-\dot{V}_R$ of the wheels and possibly the acceleration $+\dot{V}_R$ of the wheels are fed to the block 6 which in the case of instability controls the brake pressure by means of a valve 8.

In order to form the reference speed $V_{Ref}$, the wheel speed $V_R$ and the acceleration $\dot{V}_F$ of the vehicle measured with a vehicle acceleration sensor 7 are fed to the reference former 5.

As long as no instability of the wheels is present, the wheel speed signal $V_R$ determines the characteristic curve of the reference speed. If the wheels run into a high degree of slip, the reference speed $V_{Ref}$ then no longer follows the wheel speed. Instead, the deceleration of the vehicle now determines the characteristic curve of $V_{Ref}$. The wheel speed gradient $-\dot{V}_R$ is compared to the vehicle deceleration $-\dot{V}_F$ in block 9. If, starting from a time, the wheel speed drops with a greater gradient than corresponds to the deceleration of the vehicle, then starting from the wheel speed $V_R$ at that time the reference speed follows a characteristic curve determined by the deceleration of the vehicle.

With a low μ it may be the case that when the vehicle is accelerating the wheels may slip slightly. The false impression of an excessively high reference is then given if now such spinning is adjoined directly by instability (e.g. panic braking). In order to prevent this and a resulting underbraking, the wheel acceleration $\dot{V}_R$ is compared with the acceleration $\dot{V}_F$ of the vehicle in the comparator 9. If the acceleration of the wheels is smaller or equal to the acceleration of the vehicle, the wheel speed $V_R$ continues to determine the characteristic curve of $V_{Ref}$. However, if $\dot{V}_R$ is greater than $\dot{V}_F$, the comparator 9 produces a signal for the reference former 5, as a result of which the measured acceleration $\dot{V}_F$ of the vehicle then determines the further rise in the reference speed. The increase in the reference speed is thus limited to the acceleration of the vehicle. The comparator 9 is designed in such a way that it only produces an output signal $V_F$ is between 0 g and e.g. 0.35 g if $\dot{V}_R$ is greater than $\dot{V}_F$. (This is the typical, and thus critical, range for slight slippage at low coefficients of friction).

What is claimed is:

1. Antilock brake control system .for a vehicle of the type comprising at least one driven wheel, said system comprising
   a wheel speed sensor at said at least one driven wheel, said wheel speed sensor providing a wheel speed signal $V_R$,
   means for determining a wheel speed gradient $\dot{V}_R$ from said wheel speed $V_R$,
   means for sensing a vehicle acceleration $\dot{V}_F$,
   means for comparing $\dot{V}_R$ to $\dot{V}_F$ at a given time,
   means for determining a vehicle reference speed $V_{Ref}$, said vehicle reference speed $V_{Ref}$ being determined by said wheel speed $V_R$ at said given time and said vehicle acceleration $\dot{V}_F$ when $\dot{V}_R$ and $\dot{V}_F$ are positive and $\dot{V}_R$ exceeds $\dot{V}_F$,
   means for determining slippage of said driven wheel based on said reference speed $V_{Ref}$ and said wheel speed $V_R$, and
   means for controlling brake pressure at said driven wheel based on said slippage at said driven wheel, said means for controlling brake pressure including at least one valve.

2. Antilock brake system as in claim 1 wherein said vehicle reference speed $V_{Ref}$ is determined by said wheel speed $V_R$ at said given time and said vehicle acceleration $\dot{V}_F$ when $\dot{V}_R$ exceeds $\dot{V}_F$ and $\dot{V}_F$ is 0 to 0.35 g.

3. Antilock brake control system as in claim 1 wherein said vehicle is an all wheel drive vehicle and a wheel speed sensor is provided at each wheel.

4. Antilock brake system as in claim 1 wherein said means for determining said vehicle reference speed $V_{Ref}$ determines $V_{Ref}$ according to $V_R$ when $\dot{V}_R$ and $\dot{V}_F$ are positive and $\dot{V}_R$ does not exceed $\dot{V}_F$.

5. Antilock brake control system as in claim 1 wherein said means for determining said vehicle reference speed $V_{Ref}$ determines said vehicle reference speed by said wheel speed $V_R$ at said given time and said vehicle acceleration $\dot{V}_F$ when said wheel speed gradient $\dot{V}_R$ and said vehicle acceleration $\dot{V}_F$ are negative and $\dot{V}_R$ is less than $\dot{V}_F$.

6. Antilock brake system as in claim 5 wherein said means for determining said vehicle reference speed $V_{Ref}$ determines $V_{Ref}$ according to $V_R$ when $\dot{V}_R$ and $\dot{V}_F$ are negative and $\dot{V}_R$ is not less than $\dot{V}_F$.

* * * * *